United States Patent [19]

Ito

[11] Patent Number: 5,623,522

[45] Date of Patent: Apr. 22, 1997

[54] ASYNCHRONOUS SERIAL DATA RECEIVING DEVICE

[75] Inventor: Masahiro Ito, Hamamatsu, Japan

[73] Assignee: Yamaha Corporation, Hamamatsu, Japan

[21] Appl. No.: 561,355

[22] Filed: Nov. 21, 1995

[30] Foreign Application Priority Data

Nov. 21, 1994 [JP] Japan .................................. 6-286515

[51] Int. Cl.⁶ ................................................. H04L 25/38
[52] U.S. Cl. ........................... 375/369; 375/362; 370/305
[58] Field of Search ...................................... 375/354, 362, 375/369, 370; 370/48, 100.1, 47, 105.5

[56] References Cited

U.S. PATENT DOCUMENTS

| | | | |
|---|---|---|---|
| 3,996,523 | 12/1976 | Schmid | 375/369 |
| 4,715,044 | 12/1987 | Gartner | 375/369 |
| 4,748,643 | 5/1988 | Setoguchi et al. | 375/369 |
| 5,263,054 | 11/1993 | Davis et al. | 375/369 |

*Primary Examiner*—Tesfaldet Bocure
*Assistant Examiner*—Bryan Webster
*Attorney, Agent, or Firm*—Loeb & Loeb LLP

[57] ABSTRACT

An asynchronous serial data receiving device receives serial data, containing main data of bits sandwiched between a start bit and a stop bit, which are transmitted thereto in an asynchronous manner. In the device, the serial data are temporarily stored in a shift register circuit in response to high-speed clocks whose speed is higher than transmission rate of the serial data. A counter circuit counts number of the high-speed clocks. Every time a change of level is detected in the serial data, counting operation of the counter circuit is reset so that the counter circuit re-starts counting from its initial number. The change of level is detected responsive to the serial data or noise. Existence of the start bit is acknowledged on the basis of a fact that the counter circuit continues counting for a window time, without being reset, in a duration of the start bit. Herein, the window time is less than a half of the duration of the start bit. Even if the noise occurs in a former-half part of the duration of the start bit so that the counter circuit resets counting operation, the counter circuit re-starts the counting operation which is then continued for the window time; therefore, existence of the start bit is acknowledged. Thereafter, the serial data are read out from the shift register circuit and are extracted as parallel data in accordance with extraction clocks which are produced in response to the counter circuit.

3 Claims, 12 Drawing Sheets

ASYNCHRONOUS SERIAL DATA RECEIVING DEVICE

BACKGROUND OF THE INVENTION

1. Field of the Invention

The invention relates to asynchronous serial data receiving devices which operate based on start-stop-synchronization communication method (or asynchronous communication method).

2. Prior Art

According to the start-stop-synchronization communication method, serial data are transmitted in such a way that a start bit is provided as a first bit while a stop bit is provided as a last bit wherein the serial data are sandwiched between those bits. In such a method, it is important to correct counting operation of a counter, which is provided to create clocks for extraction of data, in response to detection of the start bit.

Normally in the start-stop-synchronization method, level of a line (or lines) is remained at '1' under a non-communication state where data communication is not performed; and the start bit is at '0'. Some technology conventionally known, such as a paper of Japanese Patent Laid-Open No. 4-354220, discloses a method for detection of the start bit, as follows:

There is provided a counter which starts to count number of clocks, whose speed is higher than that of transmission rate, when detecting a trailing edge of a start bit. The counter is started; and based on result of counting, a state of a line (i.e., level '1' or '0' of the line) is detected multiple times within transmission rate of receiving signals (i.e., within one-bit time). Then, the states of the line detected are subjected to decision by majority. Thus, detection of the start bit is completed.

However, the detection of the start bit described above has problems as follows:

If a drop-out event occurs, in other words, if noise, whose level is relatively large, occurs in a former-half period of a start bit, the conventional method, using decision by majority, fails to detect the start bit. In such an event, it is not possible to detect the start bit. So, there is a problem that reading operation for data transmitted cannot be performed. Performance in detection of the start bit may be improved by increasing number of conditions which are used to detect the start bit. However, such an improvement results in an increase of a circuit scale of a data receiving device.

SUMMARY OF THE INVENTION

It is an object of the present invention to provide an asynchronous serial data receiving device which is capable of accurately detect a start bit, even if large noise occurs, so as to correct counting operation for clocks which are used for extraction of input serial data.

An asynchronous serial data receiving device of the invention is fundamentally provided to receive serial data, containing main data of bits sandwiched between a start bit and a stop bit, which are transmitted thereto in an asynchronous manner. In the device, the serial data are temporarily stored in a shift register circuit in response to high-speed clocks whose speed is higher than transmission rate of the serial data. A counter circuit counts number of the high-speed clocks. Every time a change of level (e.g., a trailing edge) is detected in the serial data, counting operation of the counter circuit is reset so that the counter circuit re-starts counting from its initial number. The change of level is detected responsive to the serial data or noise. Existence of the start bit is acknowledged on the basis of a fact that the counter circuit continues counting for a window time, without being reset, in a duration of the start bit. Herein, the window time is less than a half of the duration of the start bit.

So, even if the noise occurs in a former-half part of the duration of the start bit so that the counter circuit resets counting operation, the counter circuit re-starts the counting operation which is then continued for the window time; therefore, existence of the start bit is acknowledged. Thereafter, the serial data are read out from the shift register circuit and are extracted as parallel data in accordance with extraction clocks which are produced in response to the counter circuit.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENTS

[A] First Embodiment

Figure 1:
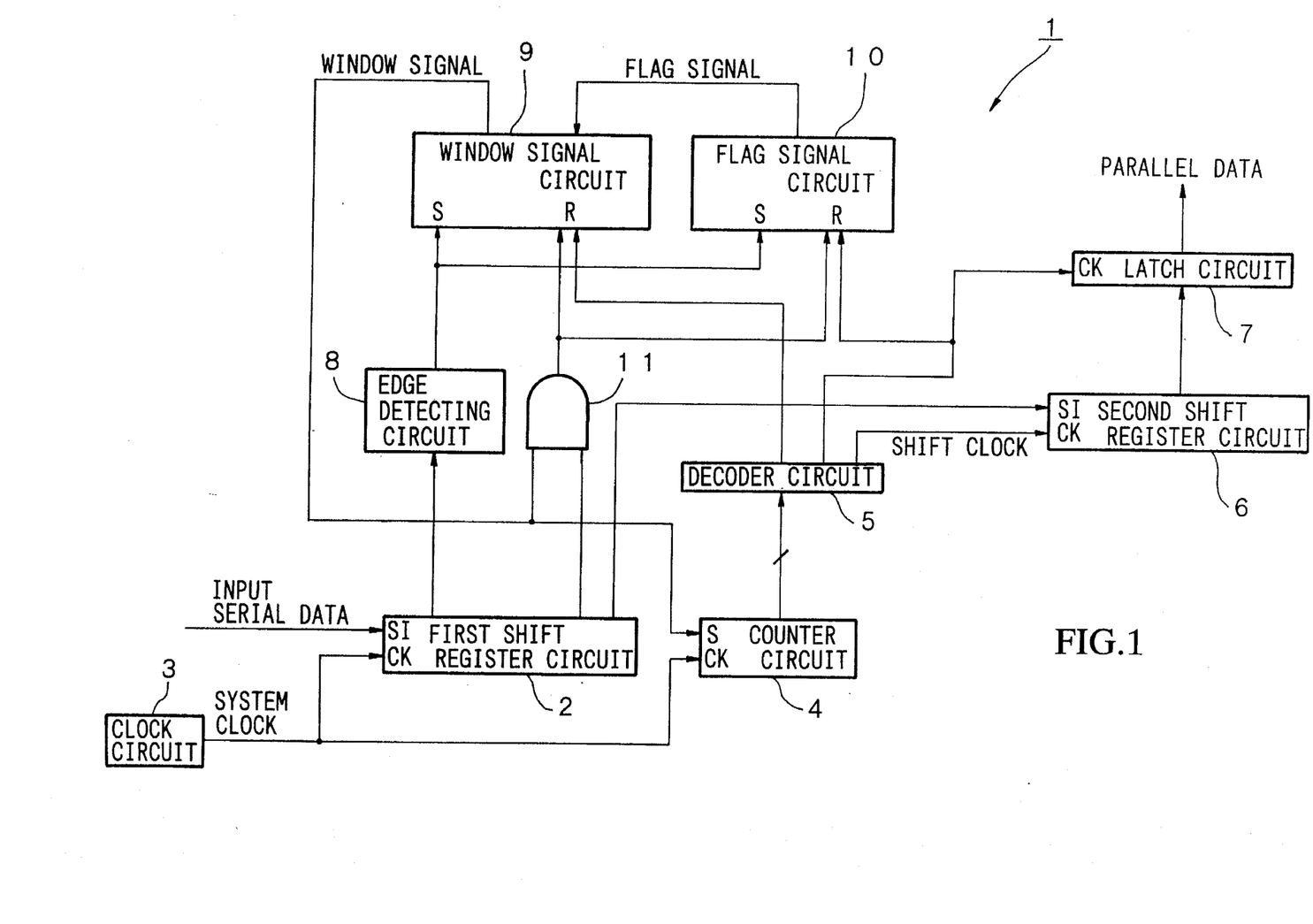
FIG. 1 is a block diagram showing a configuration of an asynchronous serial data receiving device which is designed in accordance with a first embodiment of the invention.

FIG. 1 shows a configuration of an asynchronous serial data receiving device 1 which is designed in accordance with a first embodiment of the invention. The device 1 is configured by a first shift register circuit 2, a clock circuit 8, a counter circuit 4, a decoder circuit 5, a second shift register circuit 6, a latch circuit 7, an edge detecting circuit 8, a window signal circuit 9, a flag signal circuit 10 and a logical gate 11. Herein, the first shift register circuit 2 receives input serial data transmitted thereto; the clock circuit 8 produces high-speed clocks, whose speed is higher than a bit rate of the input serial data, as system clocks; the counter circuit 4 counts number of the system clocks outputted from the clock circuit 3; the decoder circuit 5 produces a variety of signals based on a count number of the counter circuit 4; the second shift register circuit 6 receives serial data, from the first shift register circuit 2, which are delayed behind the input serial data by 'n' clocks; the latch circuit 7 extracts and latches parallel data from the second shift register circuit 6; and the edge detecting circuit 8 detects a trailing edge of the input serial data received by the first shift register circuit 2. In addition, the window signal circuit 9 produces a window signal; and the flag signal circuit 10 produces a flag signal, wherein details of the window signal and flag signal will be described later. The logical gate 11 produces a RESET signal which resets the window signal and flag signal.

Figure 2:
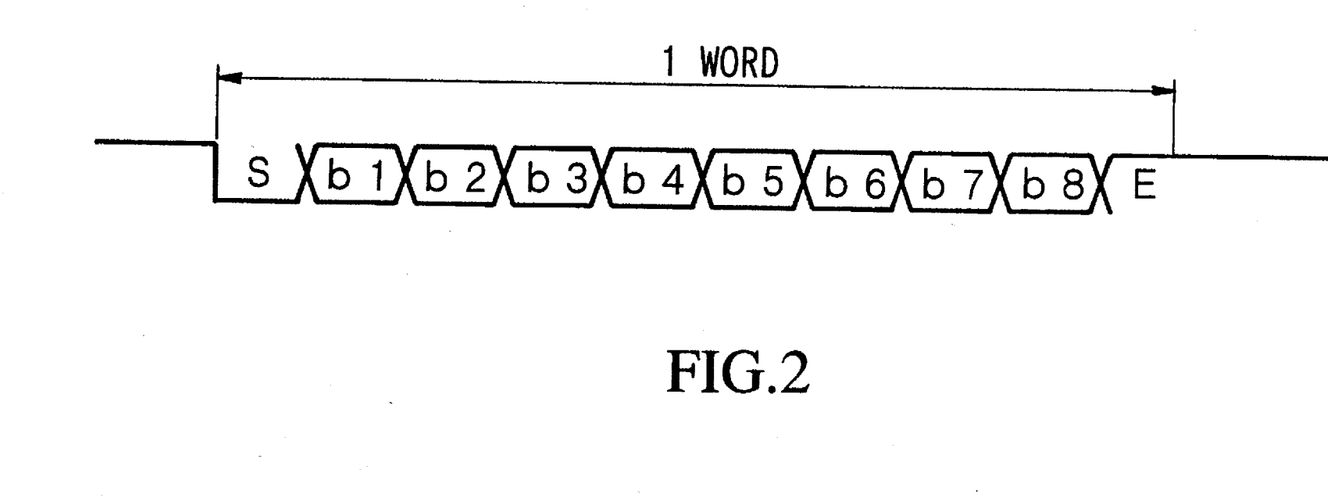
FIG. 2 shows a configuration of input serial data.

FIG. 2 shows a data form of the input serial data received by the device 1. Herein, one word consists of 10 bits which are constructed by main data of 8 bits (i.e., b1 to b8), a start bit S and a stop bit E. The main data of 8 bits are sandwiched between the bits S and E, wherein level of the start bit S is '0' while level of the stop bit E is '1'. Normally in a transmission system based on the start-stop-synchronization method, the device cannot obtain clocks of serial data transmitted thereto. Transmission rate for each bit is 31.25 kHz±1% in case of MIDI standard, for example. In addition, a receiving interval of time between two words consecutively transmitted is arbitrarily determined, so it is not set constant. Further, level of a line (or lines) is remained at '1' under the non-communication state.

In the asynchronous serial data receiving device of FIG. 1, input serial data, transmitted on a line (not shown), are received by the first shift register circuit 2. The first shift register circuit 2 and the counter circuit 4 operate based on the system clocks which are outputted from the clock circuit 3. The edge detecting circuit 8 receives serial data, which are delayed behind the input serial data by one clock, from the first shift register circuit 2. The edge detecting circuit 8 detects a trailing edge of the serial data. When detecting the trailing edge, the edge detecting circuit 8 produces a SET signal, which is delivered to the window signal circuit 9 and the flag signal circuit 10. Upon receipt of the SET signal, the window signal circuit 9 produces a window signal (i.e., a pulse signal). The window signal is delivered to a first input of the logical gate 11 and a SET terminal of the counter circuit 4.

Responsive to a leading edge of the window signal, the counter circuit 4 sets a count number at '01' in hexadecimal notation. The counter circuit 4 counts number of the system clocks which are outputted from the clock circuit 3. In the first embodiment, the counter circuit 4 is configured as an 8-bit counter.

Upon receipt of the SET signal from the edge detecting circuit 8, the flag signal circuit produces a flag signal. The flag signal is supplied to the window signal circuit 9. In a duration of receiving the flag signal, the window signal circuit 9 does not produce a window signal even if the SET signal is supplied thereto. In contrast, the window signal circuit 9 produces a window signal when receiving the SET signal in a duration which the flag signal is not supplied thereto. Thereafter, even if the flag signal is supplied to the window signal circuit 9, the window signal is not reset.

A second input of the logical gate 11 receives 1-clock-delayed serial data, from the first shift register circuit 2, which are delayed behind the input serial data by one clock. So, the logical gate 11 yields logical product between the window signal and serial data so as to produce a RESET signal. The RESET signal is delivered to the window signal circuit 9 and the flag signal circuit 10 at their RESET terminals. That is, every time the serial data turn to '1' in a duration which the window signal continues, the RESET signal is delivered to the window signal circuit 9 and the flag signal circuit 10.

The RESET terminal of the window signal circuit 9 receives another RESET signal which is produced by the decoder circuit 5. The decoder circuit 5 supplies the RESET signal when a count number of the counter circuit 4 reaches a predetermined number. Incidentally, time between a first moment, when a window signal is outputted, and a second moment when the window signal is reset by the decoder circuit 5, is called "window time". As described before, the window signal circuit 5 initiates production of a window signal when receiving a SET signal from the edge detecting circuit 8; and production of the window signal is reset when a data value '1' emerges in 1-clock-delayed serial data from the first shift register circuit 2 or when a count number of the counter circuit 4 reaches the predetermined number.

The second shift register circuit 6 receives n-clock-delayed serial data, from the first shift register circuit 2, which are delayed behind the input serial data by 'n' clocks. In addition, the second shift register circuit 6 receives shift clocks from the decoder circuit 5. Upon receipt of the shift clocks, the second shift register circuit 6 reads out the n-clock-delayed serial data from the first shift register circuit 2, so the serial data are stored therein with being sequentially shifted.

The decoder circuit 5 produces a parallel-extraction signal when a count number of the counter circuit 4 reaches the predetermined number; and the parallel-extraction signal is supplied to the latch circuit 7. The parallel-extraction signal is outputted at a timing when the second shift register circuit 6 completes storing of a certain amount of serial data which correspond to one word of the input serial data received by the first shift register circuit 2. Details about this timing will be described later. When receiving the parallel-extraction signal from the decoder circuit 5, the latch circuit 7 reads out the serial data from the second shift register circuit 6 in response to the shift clocks as parallel data, so the parallel data are latched therein.

After outputting the parallel-extraction signal, the decoder circuit 5 outputs a RESET signal to the flag signal circuit 10. Upon receipt of the RESET signal, the flag signal circuit 10 resets the flag signal.

Thereafter, if input serial data are newly transmitted to the device after resetting of the flag signal, the edge detecting circuit 8 detects a trailing edge of the input serial data newly transmitted. So, processes described heretofore are repeated with respect to the input serial data newly transmitted.

Figure 3:
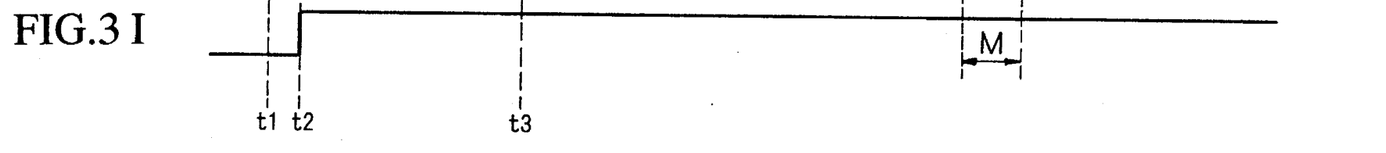
FIGS. 3A to 3I are time charts, showing signals and data which are made responsive to a window time of 7.5 clocks, wherein the time charts are used to explain operations of the device regarding detection of a start bit.
Figure 3A:
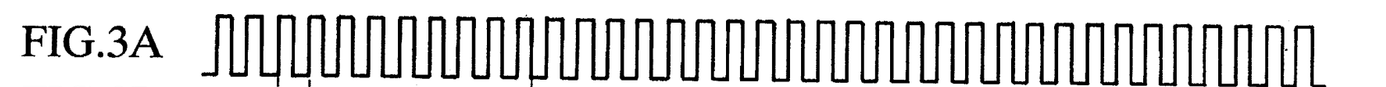
Figures 3B, 3C:
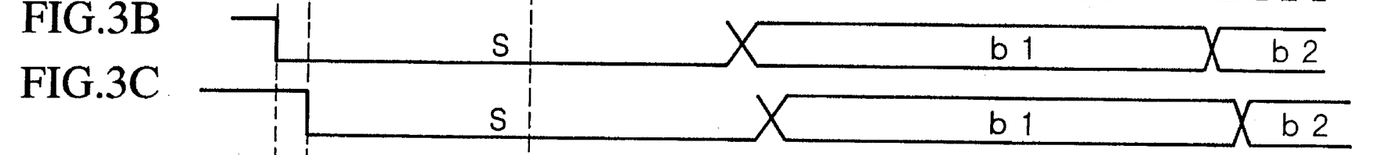
Figure 3D:
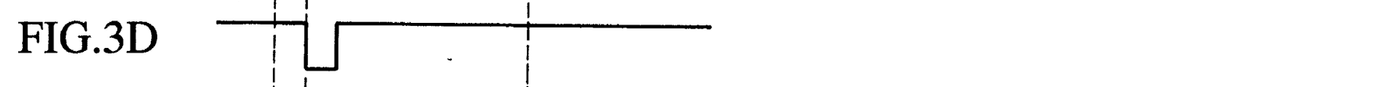
Figure 3E:
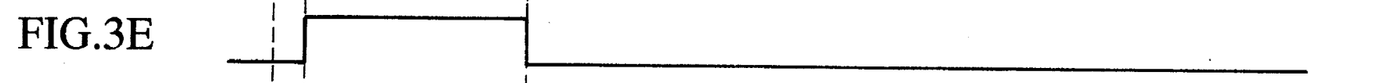
Figure 3F:
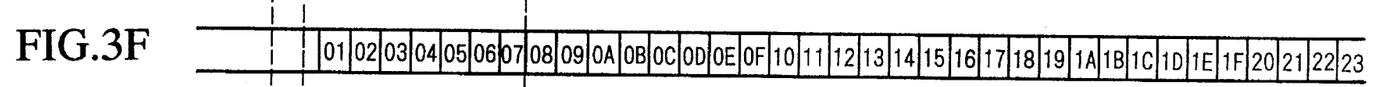
Figure 3H:
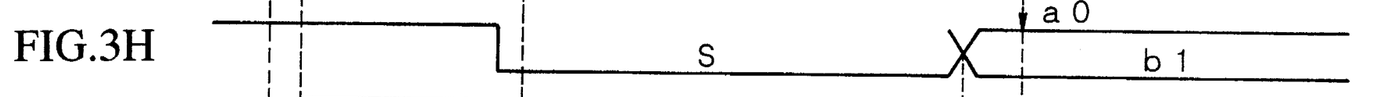

Next, operations of the asynchronous serial data receiving device 1 of the first embodiment will be described in detail with reference to FIGS. 3A to 3I. Those figures are time charts which are used to explain process in detection of the start bit S as well as process in extraction of transmitted data. The time charts correspond to a state where noise does not occur in the start bit S. Incidentally, other time charts, regarding a state where noise occurs in the start bit S, will be described later. FIG. 3A shows system clocks which are outputted from the clock circuit 3. In the first embodiment, the system clocks are high-speed clocks whose speed is 16 times higher than the transmission rate for each bit. In addition, FIG. 3B shows input serial data; FIG. 3C shows 1-clock-delayed serial data which are delayed behind the input serial data by one clock by the first shift register circuit 2; FIG. 3D shows an edge-detection signal (i.e., the aforementioned SET signal) produced by the edge detecting circuit 8; FIG. 3E shows a window signal produced by the window signal circuit 9; FIG. 3F shows a series of count numbers given by the counter circuit 4 which counts number of system clocks; FIG. 3G shows shift clocks used for determining timings by which the second shift register circuit 6 reads out serial data from the first shift register circuit 2; FIG. 3H shows 7.5-clock-delayed serial data which are outputted from the first shift register circuit 2 and which are delayed behind the input serial data by 7.5 clocks corresponding to the aforementioned window time; and FIG. 3I shows a flag signal which is produced by the flag signal circuit 10. Incidentally, the counter circuit 4 is configured as an 8-bit counter.

The first shift register circuit 2 normally delays the input serial data (having data value of '1' or '0') by one clock, so the 1-clock-delayed serial data are supplied to the edge detecting circuit 8. If the input serial data are transmitted on a line, level of the line is changed from '1' to '0' by a start bit S, which is placed at a top position of the input serial data, at a moment t1. Since the edge detecting circuit 8 receives the 1-clock-delayed serial data, the edge detecting circuit 8 detects a trailing edge (i.e., an event in which level of the line is changed from '1' to '0') at a moment t2 which is delayed behind the moment t1 by one clock. Thus, the edge detecting circuit 8 produces a SET signal, i.e., an edge-detection signal, wherein the edge-detection signal is a reversed pulse so that the edge detecting circuit 8 forms a leading edge of the reversed pulse at the moment t2. The SET signal is delivered to the window signal circuit 9 and the flag signal circuit 10. Thus, the window signal circuit 9 produces a window signal; in other words, the window signal circuit 9 forms a leading edge of an elongated pulse at the moment t2, wherein the elongated pulse have a certain pulse width which corresponds to the aforementioned window time. In addition, the flag signal circuit 10 produces a flag signal; in other words, the flag signal circuit 10 forms a leading edge of an elongated pulse at the moment t2. The window signal is supplied to the counter circuit 4; therefore, a count number of the counter circuit 4, which counts number of system clocks, is set at '01' in hexadecimal notation.

The logical gate 11 receives the window signal as well as the 1-clock-delayed serial data outputted from the first shift register circuit 2. Thus, logical product between them is supplied to the window signal circuit 9 and the flag signal circuit 10 at their RESET terminals. In other words, in response to arrival of '1' from the first shift register circuit 2, the logical gate 11 produces a RESET signal, which is delivered to the window signal circuit 9 and the flag signal circuit 10. Herein, the logical gate 11 outputs the RESET signal if noise occurs in the start bit S so that level of the line turns to '1'. Such a noise event will be described later.

When a count number of the counter circuit 4 reaches '08' in hexadecimal notation, the decoder circuit 5 produces a RESET signal which is supplied to the window signal circuit 9 at a moment t3. Upon receipt of the RESET signal from the decoder circuit 5, the window signal circuit 9 resets the window signal; in other words, the window signal circuit 9 forms a trailing edge of the elongated pulse. As described before, time between the moment t2, when production of the window signal is initiated, and the moment t3, when production of the window signal is reset by the RESET signal outputted from the decoder circuit 5, is called the window time. In the first embodiment, the window time is an equivalence of 7.5 clocks. So, the window time is less than a half of 16 clocks which correspond to transmission rate of the start bit S. When the window signal is reset by the decoder circuit 5, it is declared that detection of the start bit S is completed.

The decoder circuit 5 produces a shift clock corresponds to a signal which is obtained by delaying an output of a fourth bit position, counted from a lowest bit position, of the counter circuit 4 by 0.5 clock. The shift clock is supplied to the second shift register circuit 6. The second shift register circuit 6 receives 7.5-clock-delayed serial data which are delayed behind the input serial data by 7.5 clocks corresponding to the window time. In response to a leading-edge timing of the shift clock, the 7.5-clock-delayed serial data are read out and stored, with being shifted, in the second shift register circuit 6. Thus, the start bit S is stored at a first bit position of the second shift register circuit 6. Thereafter, every time a shift clock arrives at the second shift register circuit 6, the 7.5-clock-delayed serial data are read out and stored, with being shifted, in the second shift register circuit 6.

As described above, the second shift register circuit 6 receives the shift clock corresponding to the signal which is obtained by delaying the fourth bit position, counted from the lowest bit position, of the counter circuit 4 by a half clock. Therefore, a timing (i.e., a leading-edge timing of the shift clock), by which the 7.5-clock-delayed serial data are read out and stored, with being shifted, in the second shift register circuit 6, emerges every time the counter circuit 4 counts 16 clocks. As described before, transmission rate for one bit of the input serial data is an equivalence of 16 bits. So, the shift clock is supplied to the second shift register circuit 6 by every transmission rate of the input serial data. That is, each bit of the 7.5-clock-delayed serial data is read out and stored, with being shifted, in the second shift register circuit 6 in response to a timing 'a0' which is delayed behind a change point, between consecutive two bits, by a time delay 'M'.

Incidentally, even if two bits, respectively set at '1' and '0', are arranged in main data so that the edge detecting circuit 8 detects a trailing edge at a change point between those bits and the edge detecting circuit 8 outputs a SET signal to the window signal circuit 9, the window signal circuit 9 does not initiate outputting of a window signal because a flag signal has been supplied thereto. Thus, even if two bits, respectively at '1' and '0', are consecutively arranged in the main data, the count number of the counter circuit 4 is not set at '01'.

Figure 4A:
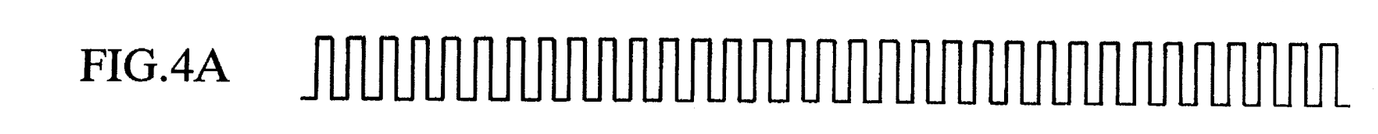
FIGS. 4A to 4H are time charts which are used to explain operations of the device regarding completion of receiving data.
Figure 4B:
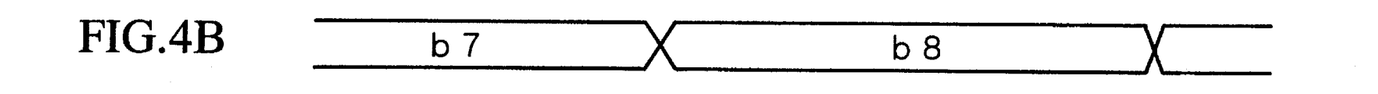
Figure 4C:
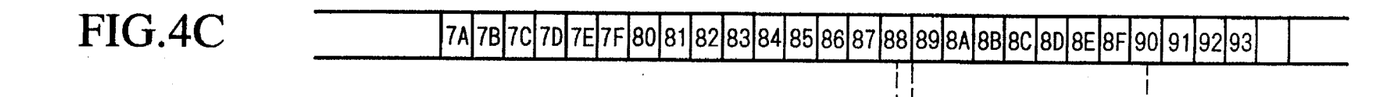
Figure 4D:
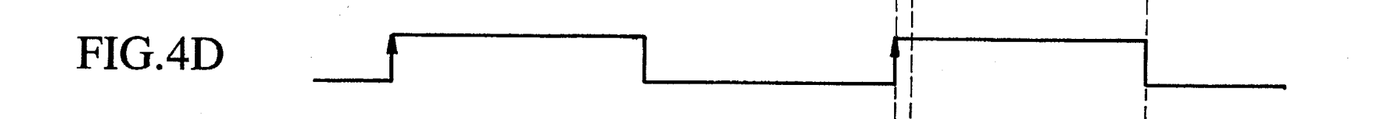
Figure 4E:
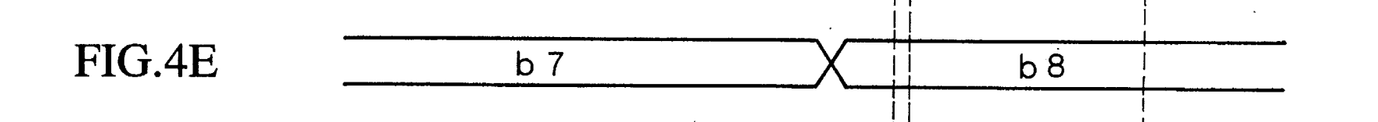
Figure 4F:
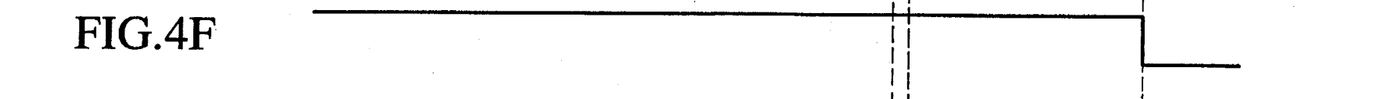
Figure 4G:
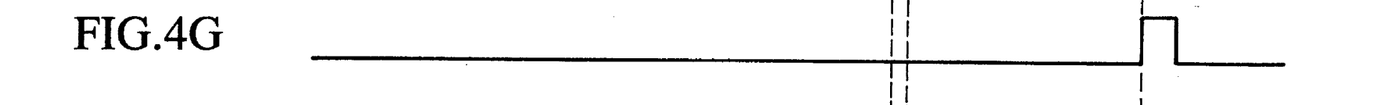
Figure 4H:
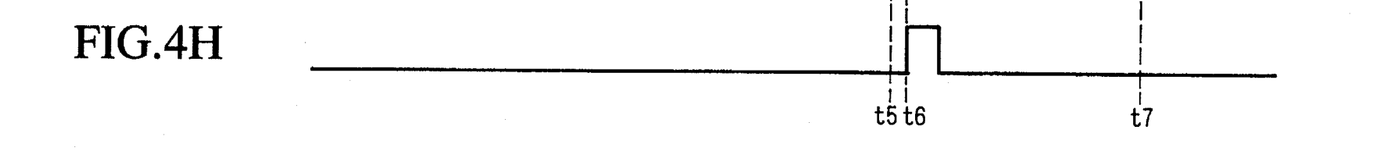

FIGS. 4A to 4H are time charts relating to an event in which a bit b8 of the serial data is read out and stored in the second shift register circuit 6. Herein, FIG. 4A shows system clocks; FIG. 4B shows 1-clock-delayed serial data; FIG. 4C shows count numbers; FIG. 4D shows shift clocks; FIG. 4E shows 7.5-clock-delayed serial data; FIG. 4F shows a flag signal; FIG. 4G shows a flag-reset signal; and FIG. 4H shows a parallel-extraction signal. The bit b8 is read out by the second shift register circuit 6 in response to a leading-edge timing t5 of a shift clock. After the bit b8 is stored, with being shifted, in the second shift register circuit 6, the decoder circuit 5 produces a parallel-extraction signal; in other words, the decoder circuit 5 forms a leading edge of a pulse of the parallel-extraction signal at a timing t6. When receiving the parallel-extraction signal, the latch circuit 7 reads out the bits b1 to b8, which are respectively stored at a first bit position to an eighth bit position of the second shift register circuit 6, as parallel data; thus, the parallel data are latched by the latch circuit 7. In the first embodiment, the timing t6, at which the decoder circuit 5 initiates outputting of the parallel-extraction signal, coincides with a timing at which a count number of the counter circuit 4 reaches '89' in hexadecimal notation. Incidentally, the timing, by which the decoder circuit 5 outputs the parallel-extraction signal, can be arbitrarily set within a duration after the bit b8 is read out and stored, with being shifted, in the second shift register circuit 6. So, the timing can be set responsive to a count number '8A' or '8B' of the counter circuit 4.

At a timing t7 which comes after the decoder circuit 5 outputs the parallel-extraction signal, the decoder circuit 5 produces a flag-reset signal. In the first embodiment, the timing t7, by which the decoder circuit 5 outputs the flag-reset signal, coincides with a count number '90' of the counter circuit 4. Incidentally, the timing can be arbitrarily set within a duration after the decoder circuit 5 outputs the parallel-extraction signal. So, the timing can be set responsive to a count number '8A', '8B', '9', '92' or so. When receiving the flag-reset signal, the flag signal circuit 10 resets the flag signal. Thereafter, if input serial data are new transmitted and received by the first shift register circuit 2, the edge detecting circuit 8 detects a trailing edge; and consequently, processes described heretofore are repeated with respect to the input serial data newly transmitted.

Figures 5A, 5B, 5C:
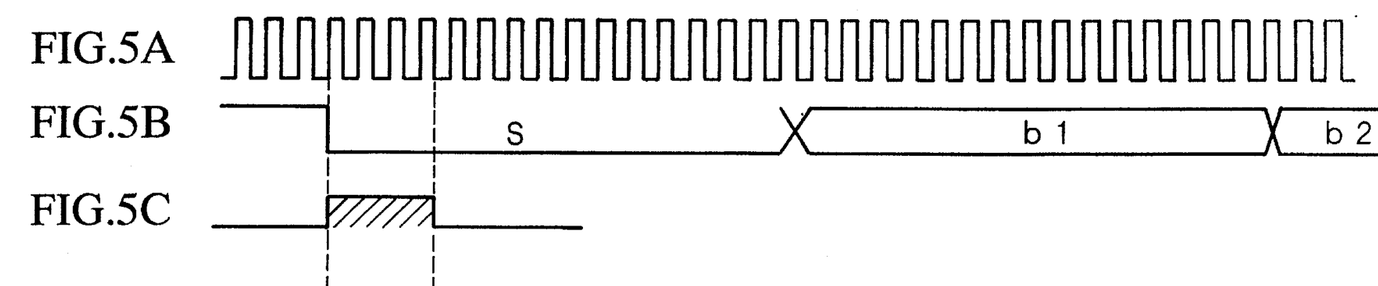
FIGS. 5A to 5I are time charts which are used to explain operations of the device regarding a noise event.
Figure 5D:
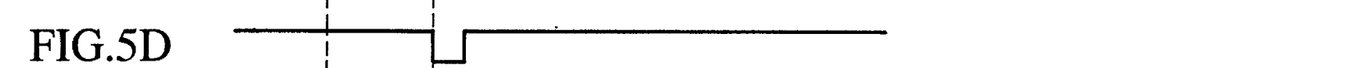
Figure 5E:
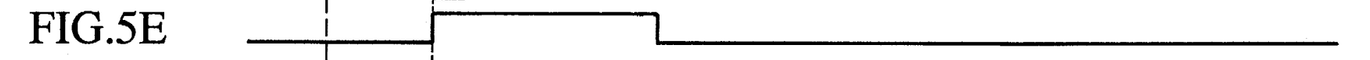
Figure 5F:
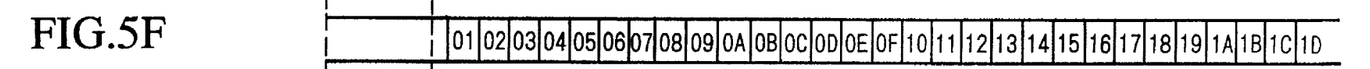
Figure 5G:
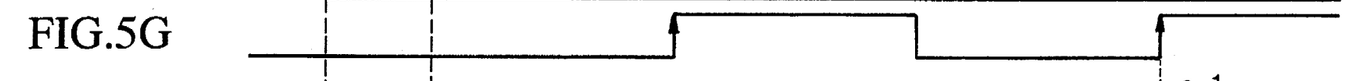
Figure 5H:
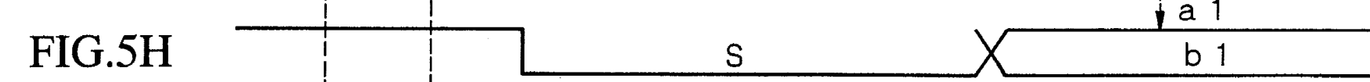
Figure 5I:
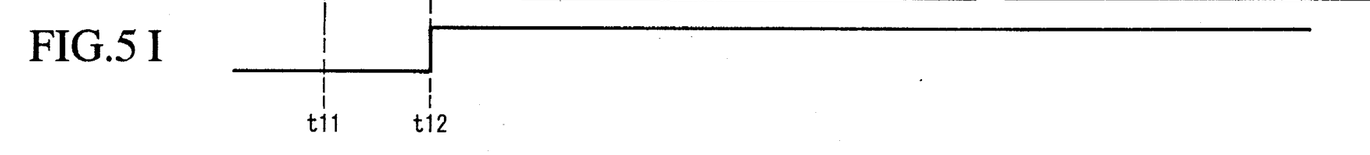

Next, an error sequence of the asynchronous serial data receiving device 1, which is initiated if noise occurs in a start bit S, will be described in detail with reference to FIGS. 5A to 5I and FIGS. 6A to 6J. Now, the description will be given with respect to a first error event, shown by FIGS. 5A to 5I, in which noise 'A' (see a pulse with hatching) occurs in a start bit S. Herein, FIG. 5A shows system clocks; FIG. 5B shows 1-clock-delayed serial data; FIG. 5C shows the noise A; FIG. 5D shows an edge-detection signal; FIG. 5E shows a window signal; FIG. 5F shows count numbers; FIG. 5G shows shift clocks; FIG. 5H shows 7.5-clock-delayed serial data; and FIG. 5I shows a flag signal. Due to occurrence of the noise A, the edge detecting circuit 8 cannot detect a trailing edge of the start bit S at a moment t11. The edge detecting circuit 8 detects the trailing edge at a moment t12 at which the noise A disappears. So, the edge detecting circuit 8 produces a SET signal, which is delivered to the window signal circuit 9 and the flag signal circuit 10. Thus, the asynchronous serial data receiving device 1 performs the aforementioned operations, so that the decoder circuit 5 produces a shift clock. Due to the noise A, the decoder circuit 5 forms a leading-edge timing of the shift clock at a timing 'a1' which is delayed behind a change point between consecutive bits of the 7.5-clock-delayed serial data, wherein the timing a1 is further delayed as compared to a normal leading-edge timing of the shift clock which is produced under a normal state where noise does not occur. Even if the leading-edge timing of the shift pulse is further delayed because of occurrence of the noise A, the device 1 works well so that bits b1 to b8 of main data are sequentially read out and stored, with being shifted, in the second shift register circuit 6.

In short, the device 1 can detect the start bit S so as to extract the main data of bits b1 to b8 from the input serial data even if the noise A occurs.

Figure 6A:
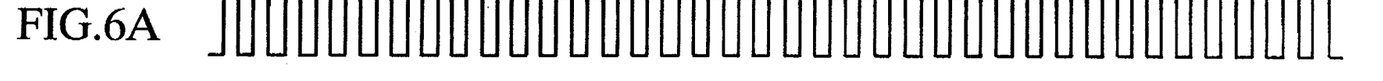
FIGS. 6A to 6J are time charts which are used to explain operations of the device regarding another noise event.
Figure 6B:
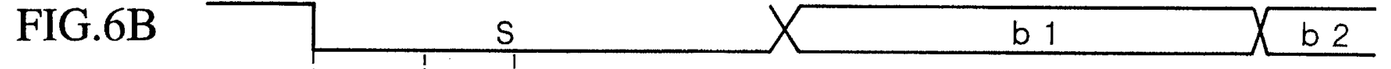
Figure 6C:
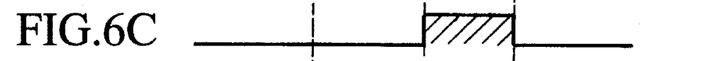
Figure 6D:
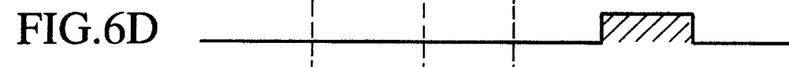
Figure 6E:
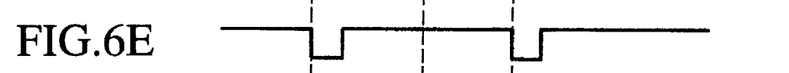
Figure 6F:
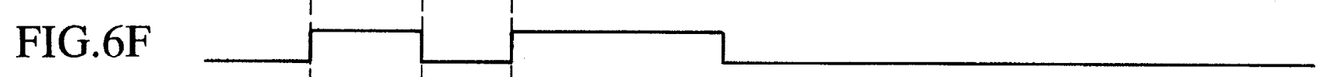
Figure 6G:
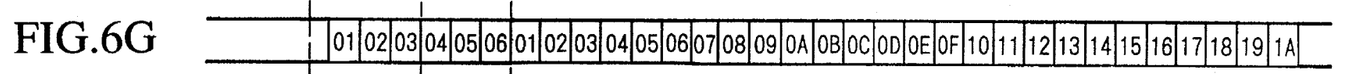
Figures 6H, 6I:
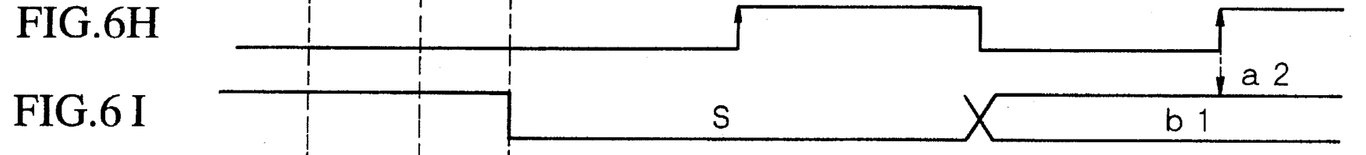
Figure 6J:
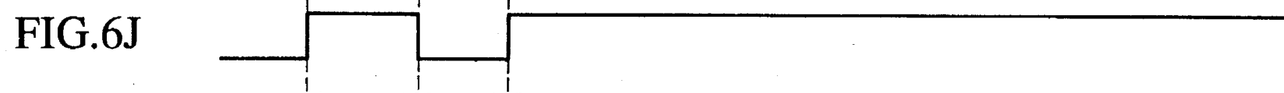

Next, the description will be given with respect to a second error event shown by FIGS. 6A to 6J. Herein, FIG. 6A shows system clocks; FIG. 6B shows 1-clock-delayed serial data; FIG. 6C shows noise 'B'; FIG. 6D shows noise 'C'; FIG. 6E shows an edge-detection signal; FIG. 6F shows a window signal; FIG. 6G shows count numbers; FIG. 6H shows shift clocks; FIG. 6I shows 7.5-clock-delayed serial data; and FIG. 6J shows a flag signal. At first, if the noise B occurs in a start bit S, the edge detecting circuit 8 detects a trailing edge of the start bit S at a moment t21; and consequently, a window signal and a flag signal are produced. Thanks to production of the window signal, a count number of the counter circuit 4 is set at '01' in hexadecimal notation. However, due to occurrence of the noise B, a signal '1' from the first shift register circuit 2 is supplied to the logical gate 11 at a moment t22; thus, output level of the logical gate 11 turns to '1'. So, a RESET signal is supplied to the window signal circuit 9 and the flag signal circuit 10; and consequently, the window signal and flag signal are reset at the moment t22.

Next, at a moment t23 when the noise B disappears, the edge detecting circuit 8 detects the trailing edge again; and consequently, a SET signal is supplied to the window signal circuit 9 and the flag signal circuit 10. This initiates production of the window signal and flag signal again. Then, the count number of the counter circuit 4 is set at '01' again by the window signal which is produced again. The asynchronous serial data receiving device 1 performs the aforementioned operations, so that the decoder circuit 5 produces a shift clock. Due to the noise B, a leading-edge timing of the shift clock is set at a timing 'a2' which is delayed behind a change point between consecutive bits of the 7.5-clock-delayed serial data, wherein the timing a2 is further delayed as compared to a normal leading-edge timing of the shift clock which is produced under a normal state where the noise does not occur. Even if the leading-edge timing is further delayed because of occurrence of the noise B, the device 1 works well so that bits b1 to b8 of main data can be sequentially read out and stored, with being shifted, in the second shift register circuit 6. In short, even if the noise B occurs, the device 1 can detect the start bit S so as to extract the main data of bits b1 to b8 from the input serial data.

Next, even if another noise C (see FIG. 6D) occurs in the start bit S, the device 1 can detect the start bit S prior to occurrence of the noise C. So, shift clocks are produced well, regardless of occurrence of the noise C. Therefore, it is possible to extract the main data of bits b1 to b8 from the input serial data.

As described above, although noise occurs, if a time length of the start bit S is long enough so that a window signal is sustained for a certain window time, detection of the start bit S can be completed; and consequently, the main data of bits b1 to b8 can be extracted from the input serial data without problem.

Time charts of FIGS. 7A to 7H, FIGS. 8A to 8I and FIGS. 9A to 9I are provided with respect to a certain situation in which a window time is set as an equivalence of 5.5 clocks. The device, which works based on the window time of 5.5 clocks, is different from the device which works based on the aforementioned window time of 7.5 clocks, as follows:

The decoder circuit 5 supplies a RESET signal to the window signal circuit 9 when a count number of the counter circuit 4 reaches '06'; and the first shift register circuit 2 provides 5.5-clock-delayed serial data to the second shift register circuit 6.

Other matters between the devices described above are same; hence, the detailed description thereof will be omitted with respect to the above time charts.

Figure 7A:
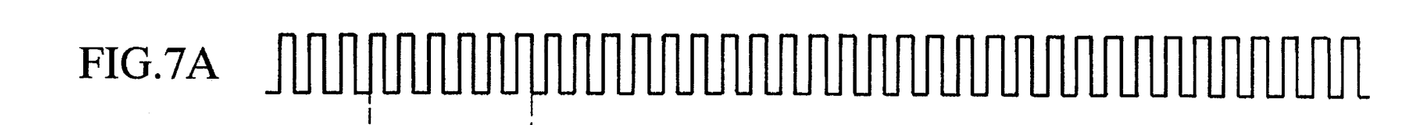
FIGS. 7A to 7H are time charts, showing signals and data which are made responsive to a window time of 5.5 clocks, wherein the time charts are used to explain operations of the device regarding detection of a start bit.
Figure 7B:
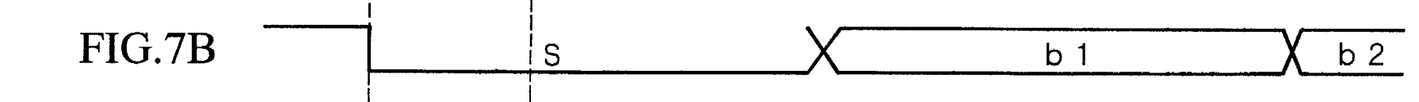
Figure 7C:
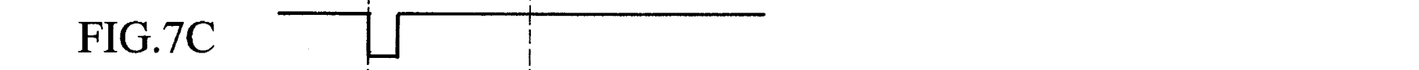
Figure 7D:
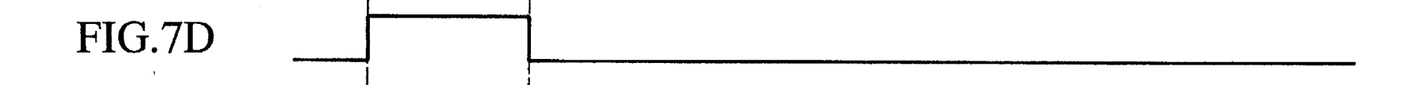
Figure 7E:
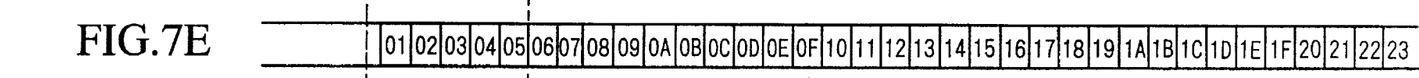
Figure 7F:
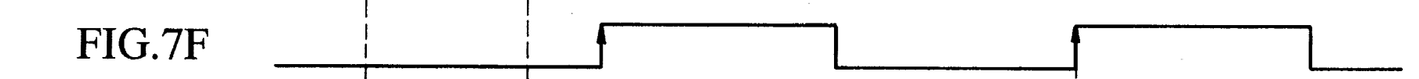
Figure 7G:
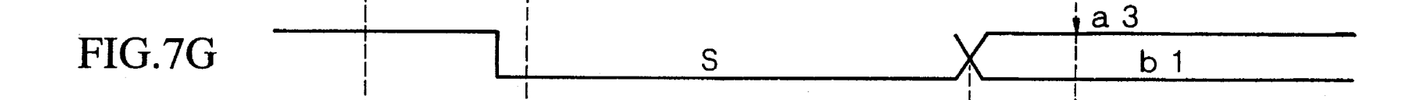
Figure 7H:
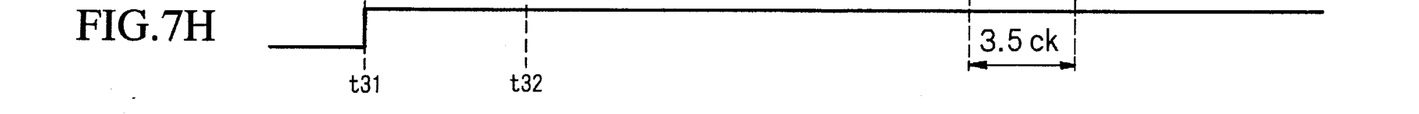

Now, FIG. 7A shows system clocks; FIG. 7B shows 1-clock-delayed serial data; FIG. 7C shows an edge-detection signal; FIG. 7D shows a window signal; FIG. 7E shows count numbers; FIG. 7F shows shift clocks; FIG. 7G shows 5.5-clock-delayed serial data; and FIG. 7H shows a flag signal. Those figures relate a normal state where noise does not occur in the start bit S. Herein, the edge detecting circuit 8 detects a trailing edge at a moment t31 so as to produce a SET signal (i.e., an edge-detection signal), which is delivered to the window signal circuit 9 and the flag signal circuit 10. At a moment t32 when a count number of the counter circuit 4 reaches '06', the decoder circuit 5 supplies a RESET signal to the window signal circuit 9. Thus, a window time of 5.5 clocks is established between the moments t31 and t32. Thereafter, the asynchronous serial data receiving device 1 performs the aforementioned operations; and consequently, the decoder circuit 5 produces a shift clock. A leading-edge timing of the shift clock is set at a timing 'a3' which is delayed behind a change point between consecutive bits of main data by 3.5 clocks. In other words, there is a margin of time, corresponding to 3.5 clocks, between a change point and a readout point of each bit. Such a margin of time is effective to absorb frequency deviation of input serial data because of reasons described below.

A certain time, between a trailing edge of the start bit S and an extraction timing of the last bit b8 of the main data, is calculated as follows:

9 bits×16 clocks=144 clocks

If frequency deviation is 1%, a change point between consecutive bits of the main data may move within a range of 1.44 clock. The first embodiment provides a margin of 3.5 clocks as described above; therefore, it is possible to absorb 2.4% of frequency deviation. However, the first shift register circuit 2 performs extraction of the main data based on the system clocks which are asynchronous with the input serial data; therefore, there may occur an asynchronous error of maximum one clock. Even if such an asynchronous error is concerned, the first embodiment can provide a margin of 2.5 clocks; therefore, it is possible to absorb 1.7% of frequency deviation.

Figure 8A:
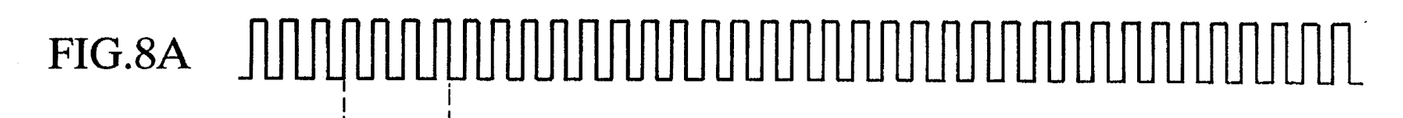
FIGS. 8A to 8I are time charts which are used to explain operations of the device regarding a noise event.
Figures 8B, 8C:
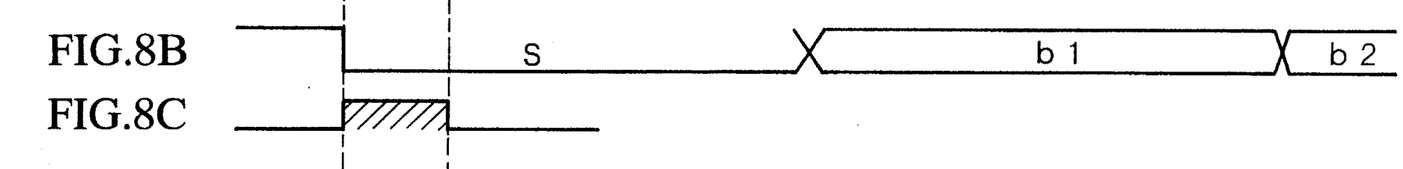
Figure 8D:
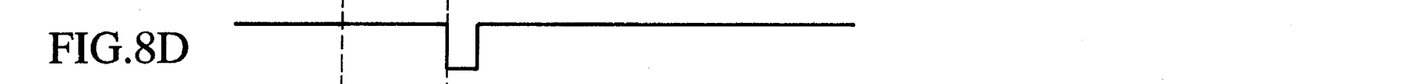
Figure 8E:
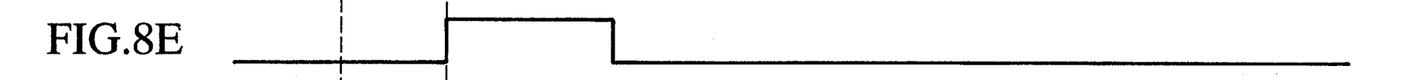
Figure 8F:
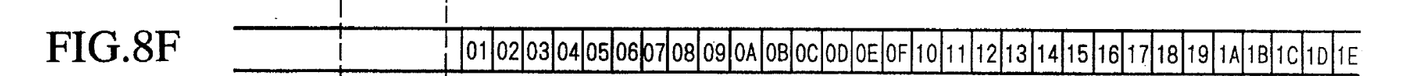
Figure 8G:
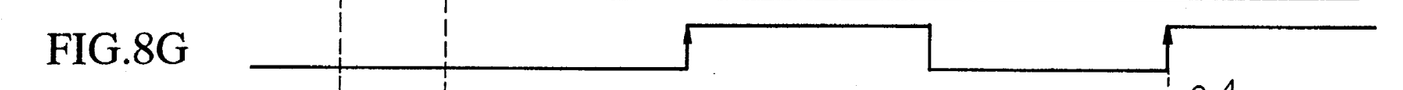
Figure 8H:
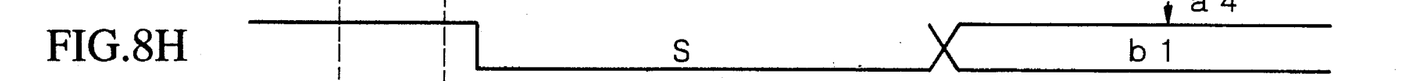
Figure 8I:
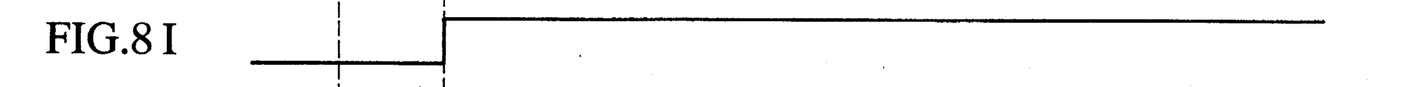

FIGS. 8A to 8I relate to a noise event in which noise 'D' occurs in a start bit S. Herein, FIG. 8A shows system clocks; FIG. 8B shows 1-clock-delayed serial data; FIG. 8C shows the noise D; FIG. 8D shows an edge-detection signal; FIG. 8E shows a window signal; FIG. 8F shows count numbers; FIG. 8G shows shift clocks; FIG. 8H shows 5.5-clock-delayed serial data; and FIG. 8I shows a flag signal. Due to occurrence of the noise D, the edge detecting circuit 8 cannot detect a trailing edge of the start bit S at a moment t41. So, the edge detecting circuit 8 detects the trailing edge at a moment t42 when the noise D disappears. Consequently, a SET signal is supplied to the window signal circuit 9 and the flag signal circuit 10. Then, the asynchronous serial data receiving device 1 performs the aforementioned operations, so that the decoder circuit 5 produces a shift clock. Herein, a leading-edge timing of the shift clock is set at a timing 'a4' which is delayed behind a change point between consecutive bits of 5.5-clock-delayed serial data, wherein the timing a4 is further delayed as compared to a normal leading-edge timing of the shift clock which is produced under a normal state where the noise does not occur. Although the leading-edge timing of the shift clock is set at such a delayed timing a4, the device 1 works well so that bits b1 to b8 of main data can be sequentially read out and stored, with being shifted, in the second shift register circuit 6.

Figure 9A:
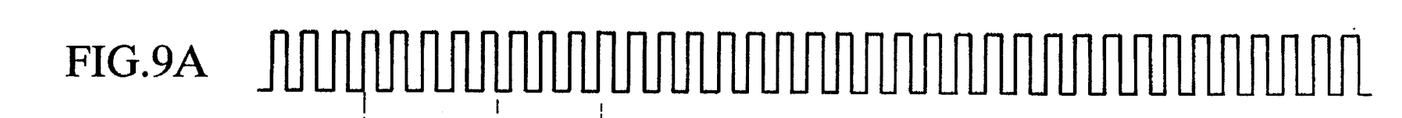
FIGS. 9A to 9I are time charts which are used to explain operations of the device regarding another noise event.
Figure 9B:
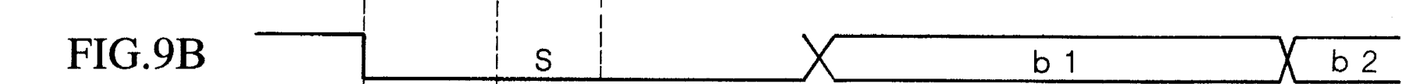
Figure 9C:
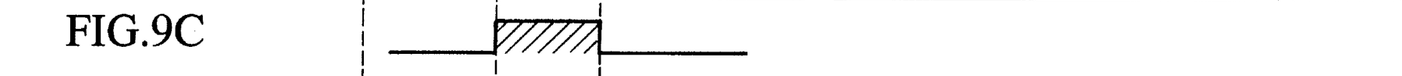
Figure 9D:
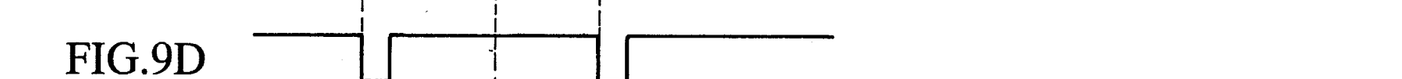
Figure 9E:
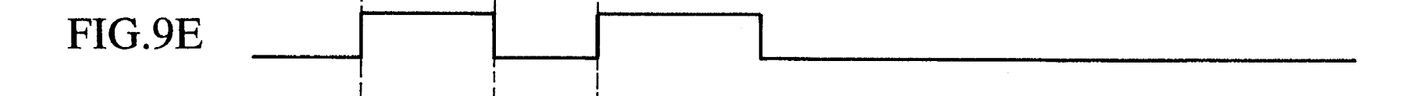
Figure 9F:
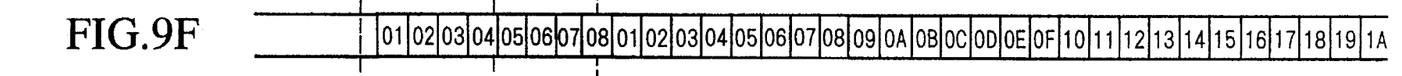
Figure 9G:
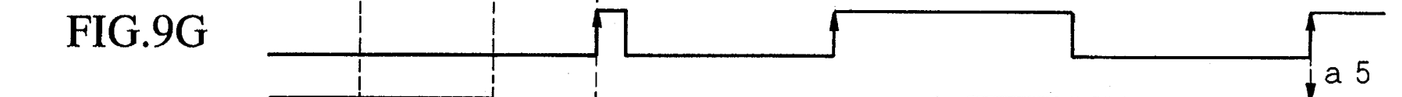
Figure 9H:
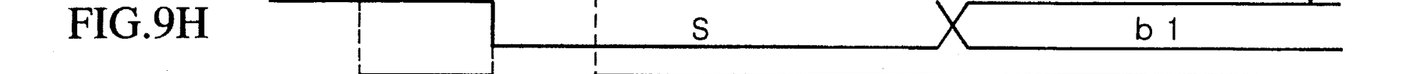
Figure 9I:
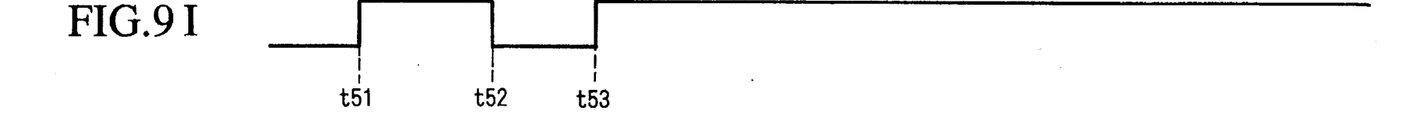

FIGS. 9A to 9I relates to another noise event in which noise 'E' occurs in a start bit S, wherein FIGS. 9A to 9I respectively correspond to FIGS. 8A to 8I except that FIG. 9C shows the noise E. Herein, the edge detecting circuit 8 detects a trailing edge of the start bit S at a moment t51; and consequently, a SET signal is supplied to the window signal circuit 9 and the flag signal circuit 10. Thus, a window signal and a flag signal are outputted from those circuits; and a count number of the counter circuit 4 is set at '01'. However, due to occurrence of the noise E, a signal '1' is outputted from the first shift register circuit 2 and is supplied to the logical gate 11 at a moment t52. This turns output of the logical gate 11 to '1'. As a result, a RESET signal is supplied to the window signal circuit 9 and the flag signal circuit 10. Consequently, the window signal and flag signal are reset.

Thereafter, the edge detecting circuit 8 detects the trailing edge again at a moment t53 when the noise E disappears; thus, a SET signal is delivered to the window signal circuit 9 and the flag signal circuit 10. So, a window signal and a flag signal are produced again. The window signal is supplied to the counter circuit 4, so its count number is set at '01' again. Then, the asynchronous serial data receiving device 1 performs the aforementioned operations, so that the decoder circuit 5 produces a shift clock. Due to occurrence of the noise E, a leading-edge timing of the shift clock is set at a timing 'a5' which is delayed behind a change point between consecutive bits of 5.5-clock-delayed serial data, wherein the timing a5 is further delayed as compared to a normal leading-edge timing of the shift clock which is produced under a normal state where the noise does not occur. Although the leading-edge timing of the shift clock is set at such a delayed timing a5, the device 1 works well so that bits b1 to b8 of main data can be sequentially read out and stored, with being shifted, in the second shift register circuit 6.

As described above, although relatively large noise occurs in the start bit S, the present embodiment, having a simple circuit configuration, can accurately detect the start bit S so that input serial data can be read out without problem if the start bit S contains a non-noise section which is sustained longer than a certain window time.

[B] Second Embodiment

Figure 10:
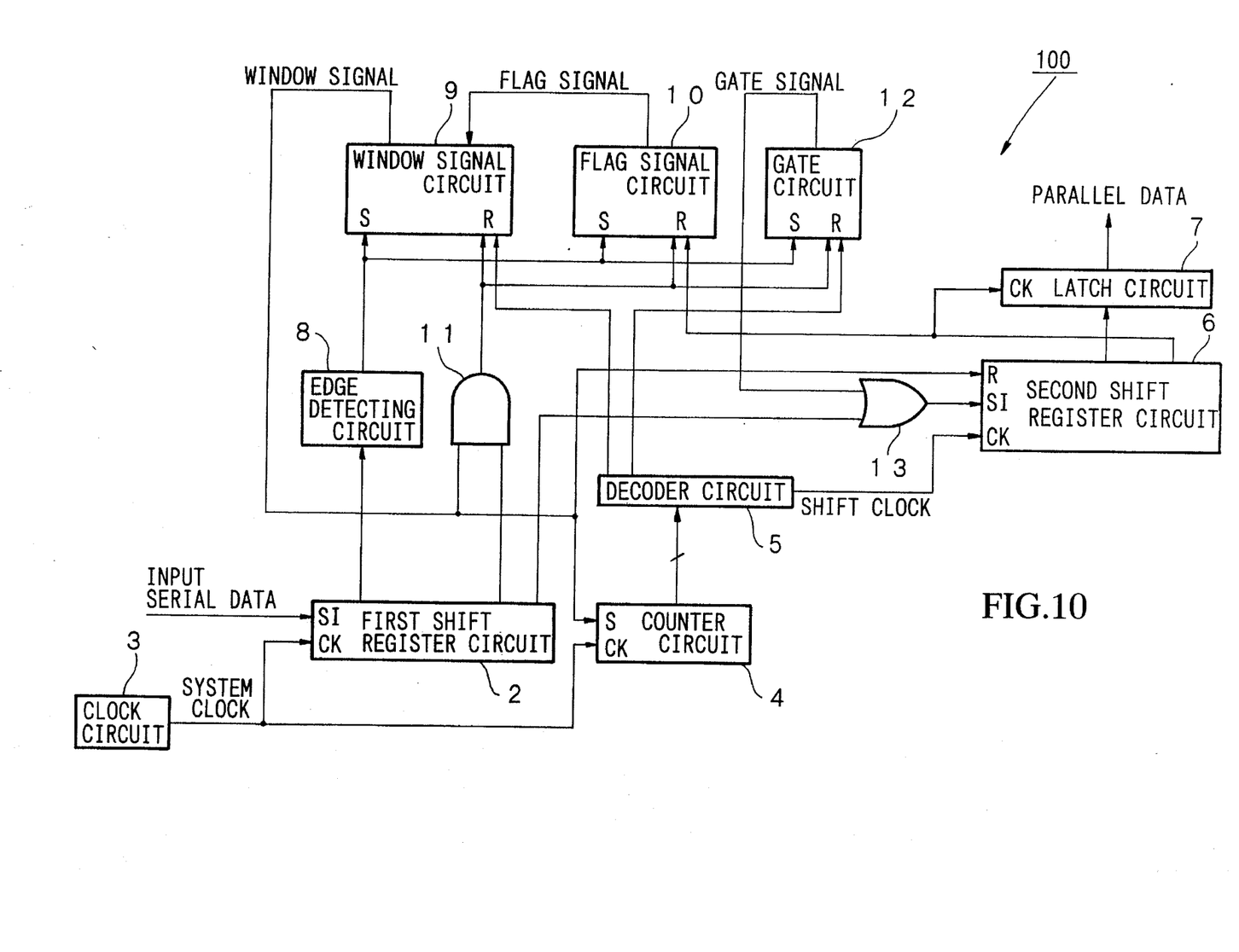
FIG. 10 is a block diagram showing a configuration of an asynchronous serial data receiving device which is designed in accordance with a second embodiment of the invention.

FIG. 10 shows an asynchronous serial data receiving device 100 which is designed in accordance with a second embodiment of the invention. Different from the aforementioned device 1 of FIG. 1, the device 100 of FIG. 10 further provides a gate circuit 12 and a logical gate 13. In FIG. 10, parts equivalent to those of FIG. 1 are designated by the same numerals; hence, the detailed description thereof will be omitted. When receiving a SET signal, produced by the edge detecting circuit 8 which detects a trailing edge of a start bit S, the gate circuit 12 produces a gate signal. The logical gate 13 receives the gate signal and output of the first shift register circuit 2; thus, the logical gate 13 conducts a logical sum between them, so that result of the logical sum is supplied to the second shift register circuit 6. The second shift register circuit 6 receives a window signal as a RESET signal. Different from the aforementioned first embodiment of FIG. 1 in which the latch circuit 7 receives the parallel-extraction signal from the decoder circuit 5, the second embodiment of FIG. 10 is designed in such a way that the latch circuit 7 receives a parallel-extraction signal from the second shift register circuit 6. Moreover, the first embodiment uses an 8-bit counter as the counter circuit 4, while the second embodiment uses a 4-bit counter as the counter circuit 4.

Figures 11A, 11B:
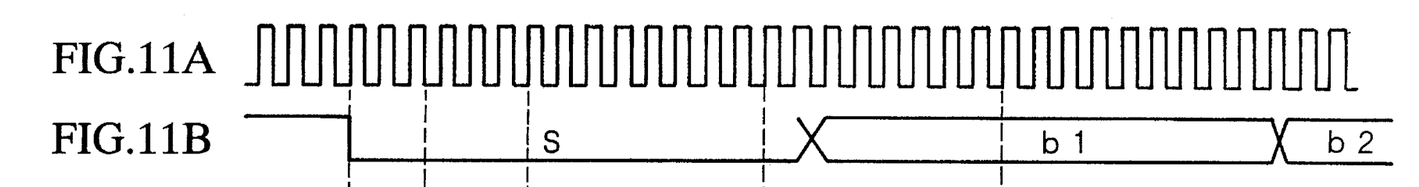
FIGS. 11A to 11J are time charts which are used to explain operations of the device regarding detection of a start bit with occurrence of noise.
Figures 11C, 11D:
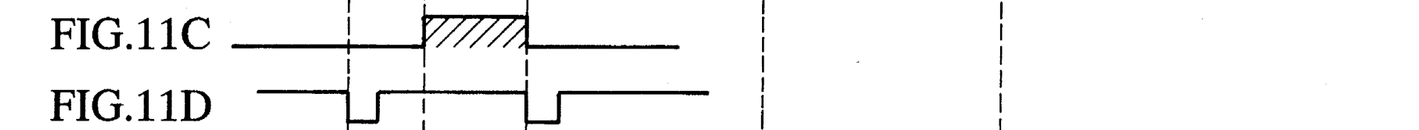
Figure 11E:
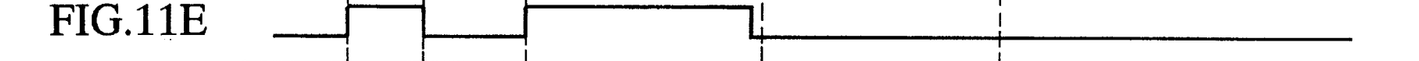
Figure 11F:
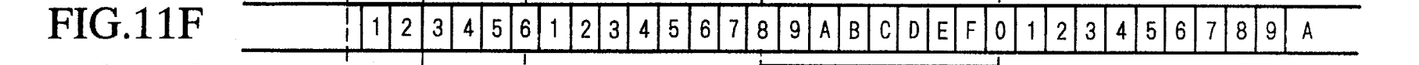
Figure 11G:
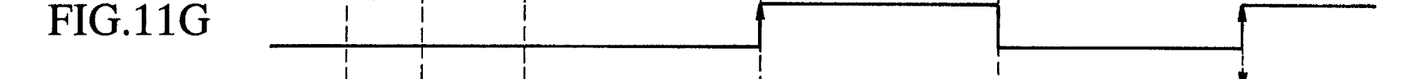
Figure 11H:
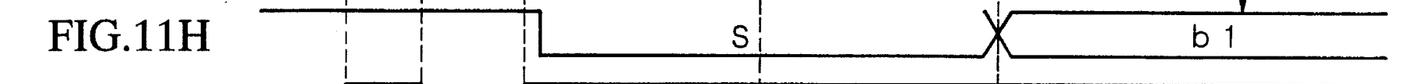
Figure 11I:
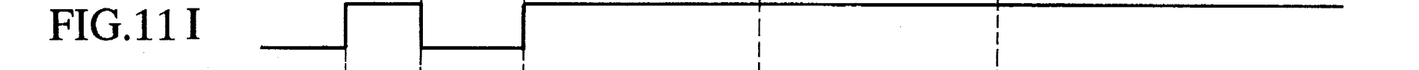
Figure 11J:
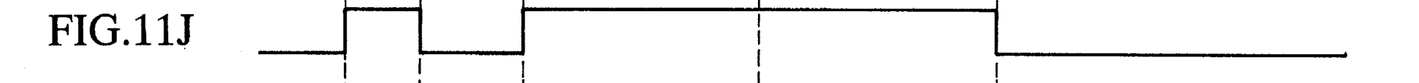

Next, operations of the asynchronous serial data receiving device 100 of the second embodiment will be described in detail with reference to FIGS. 11A to 11J and FIGS. 12A to 12I. FIGS. 11A to 11J are time charts regarding operations in detection of a start bit S, while FIGS. 12A to 12I are time charts regarding a sequence of receiving data of one word. Herein, FIG. 11A shows system clocks; FIG. 11B shows 1-clock-delayed serial data; FIG. 11C shows noise 'F'; FIG. 11D shows an edge-detection signal; FIG. 11E shows a window signal; FIG. 11F shows count numbers; FIG. 11G shows shift clocks; FIG. 11H shows 7.5-clock-delayed serial data; FIG. 11I shows a flag signal; and FIG. 11J shows a gate signal which is produced by the gate circuit 12.

Like the aforementioned device 1 of the first embodiment, the device 100 of the second embodiment operates based on system clocks whose speed is 16 times higher than transmission rate of the input serial data. In addition, the second embodiment uses a window time of 7.5 clocks. At a moment t61 when detecting a trailing edge of a start bit S in 1-clock-delayed serial data which are outputted from the first shift register circuit 2, the edge detecting circuit 8 produces a SET signal, which is delivered to the window signal circuit 9, the flag signal circuit 10 and the gate circuit 12. When receiving the SET signal, the window signal circuit 9 produces a window signal. Because of production of the window signal, the counter circuit 4 sets its count number at '1'; and the second shift register circuit 6 is reset. In addition, the flag signal circuit 10 produces a flag signal, which is supplied to the window signal circuit 9. Further, the gate circuit 12 produces a gate signal, which is supplied to the logical gate 13. The logical gate 13 receives 7.5-clock-delayed serial data, from the first shift register circuit 2, as well. Then, output of the logical gate 13 is supplied to the second shift register circuit 6. So, input level of the second shift register circuit 6 is sustained at '1' as long as the gate circuit 12 outputs the gate signal, in other words, as long as a pulse of the gate signal is sustained.

Now, if the noise F occurs at a moment t62, output level of the logical gate 11 is changed from '0' to '1'; and consequently, a RESET signal is supplied to the window signal circuit 9, the flag signal circuit 10 and the gate circuit 12. Thus, all of the window signal, flag signal and gate signal are reset. Thereafter, if the noise F disappears at a moment t63, the edge detecting circuit 8 detects the trailing edge again; and consequently, a SET signal is supplied to the window signal circuit 9, the flag signal circuit 10 and the gate circuit 12.

When a count number of the counter circuit 4 reaches '8', the decoder circuit 5 outputs a RESET signal to the window signal circuit 9, so the window signal is reset. Similar to the foregoing embodiment, the decoder circuit 5 outputs a shift clock at a timing t64 which is obtained by delaying output of a highest-bit position of the counter circuit 4 (i.e., output of a fourth-bit position of the counter circuit 4) by a half bit. The gate circuit 12 receives a RESET signal from the decoder circuit 5 at a timing t65 which comes after a leading-edge timing of the shift clock. Such a timing may be determined to coincide with a timing at which a count number of the counter circuit 4 reaches 'A', 'B' or '0', for example. When receiving the RESET signal, the gate circuit 12 resets the gate signal.

As a result of the aforementioned operations, the second shift register circuit 6 reads out the start bit S as a signal '1' so as to store it therein. As described above, the gate circuit 12 receives the RESET signal so as to reset the gate signal. Because the gate signal is reset, 7.5-clock-delayed serial data, outputted from the first shift register circuit 2, are inputted to the second shift register circuit 6. In short, the asynchronous serial data receiving device 100 stores the start bit S as the signal '1'; thereafter, the device 100 sequentially shifts and stores bits b1 to b8 of main data on the basis of shift clocks.

Figure 12:
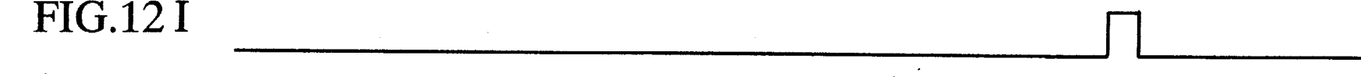
FIGS. 12A to 12I are time charts which are used to explain operations of the device regarding completion of receiving data.
Figure 12A:
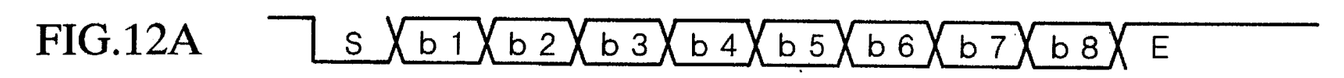
Figure 12B:
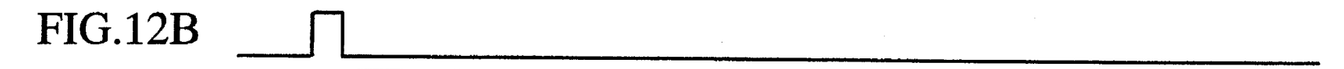
Figure 12C:
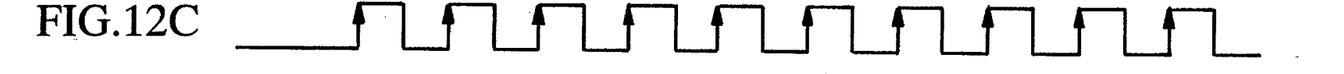
Figure 12D:
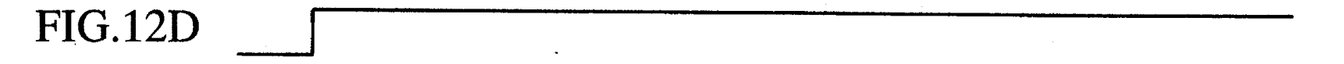
Figure 12E:
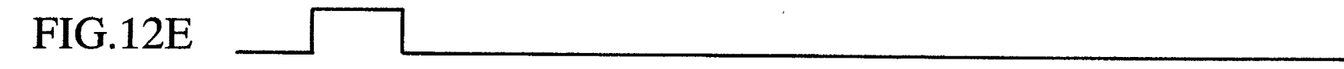
Figure 12F:
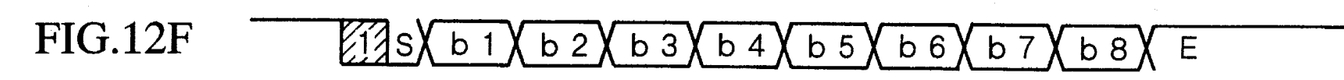
Figure 12G:
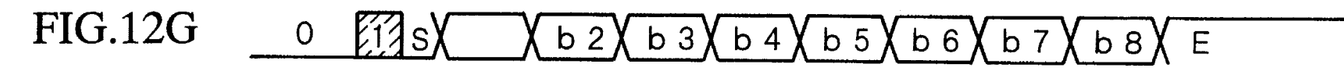
Figure 12H:
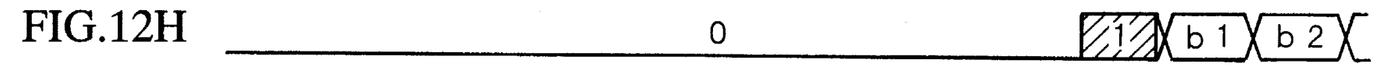

FIG. 12A shows Input serial data; FIG. 12B shows a window signal; FIG. 12C shows shift clocks; FIG. 12D shows a flag signal; FIG. 12E shows a gate signal; FIG. 12F shows output data of the logical gate 13; FIG. 12G shows data stored at a first-bit position of the second shift register circuit 6; FIG. 12H shows data stored at a ninth-bit position; and FIG. 12I shows a parallel-extraction signal. Now, after the second shift register circuit 6 stores bit b8 of the main data, in other words, after the bit b8 is stored at the first-bit position of the second shift register circuit 6, data of ninth bit firstly turns to '1' (see FIG. 12H). This is because the second shift register circuit 6 is reset by the window signal; and the start bit S has been already stored as '1'. That is, if the data of ninth bit firstly turns to '1', it is acknowledged that bits b1 to b8 of the main data are respectively stored at first-bit position to eighth-bit position of the second shift register circuit 6. The data of ninth bit are used as a parallel-extraction signal which is supplied to the latch circuit 7. By receiving the parallel-extraction signal, the latch circuit 7 can read out the main data of bits b1 to b8, corresponding to the input serial data, stored in the second shift register circuit 6, as parallel data, so the parallel data read out are latched therein. By the way, the data of ninth bit of the second shift register circuit 6 can be used as a RESET signal for the flag signal circuit 10, so the flag signal is reset by the RESET signal.

According to the second embodiment, the counter circuit 4 is designed to have ability of counting number of system clocks in connection with one bit of the input serial data. Therefore, the second embodiment is advantageous because it is possible to reduce the counter circuit 4 and the decoder circuit 5 in circuit scale.

Incidentally, the aforementioned embodiments use the system clocks whose speed is 16 times higher than the transmission rate of the input serial data. However, such a multiplying factor can be changed. Even if the multiplying factor is changed, the device can work well because timings of producing shift clocks are re-arranged responsive to a changed multiplying factor.

Further, the foregoing description regarding the embodiments is given based on the communication method in which level of line is at '1' in the non-communication state while the start bit S is at '0'. Of course, such a communication method can be changed in such a way that the level of line is at '0' in the non-communication state while the start bit S is at '1'. In that case, the asynchronous serial data receiving device is redesigned such that the edge detecting circuit detects a leading edge of the input serial data.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

What is claimed is:

1. An asynchronous serial data receiving device which receives serial data, containing main data of bits sandwiched between a start bit and a stop bit, in an asynchronous manner, the asynchronous serial data receiving device comprising:

a shift register circuit for receiving the serial data;

a clock circuit for producing high-speed clocks whose speed is higher than transmission rate of each bit of the serial data;

an edge detecting circuit for detecting a leading edge or a trailing edge of the serial data which are received by the shift register circuit;

a window signal circuit for producing a window signal when the edge detecting circuit detects the leading edge or the trailing edge;

a counter circuit to which an initial number is set by the window signal, the counter circuit counting number of the high-speed clocks outputted from the clock circuit;

start-bit-decision means for monitoring whether or not the serial data vary in a duration in which the window signal is outputted, the start-bit-decision means deciding that the start bit does not exist if the serial data vary in a decision time in which a count number of the counter circuit increases from the initial number to a predetermined number, the start-bit-decision means deciding that the start bit exists if the serial data do not vary in the decision time, the start-bit-decision means resetting the window signal when decision process thereof completes; and means for producing clocks based on the count number of the counter circuit, the clocks being used for extraction of the bits.

2. An asynchronous serial data receiving device which receives serial data, containing main data of bits sandwiched between a start bit and a stop bit, in an asynchronous manner, the asynchronous serial data receiving device comprising:

a shift register circuit for receiving and temporarily storing the serial data;

a clock circuit for producing high-speed clocks whose speed is higher than transmission rate of each bit of the serial data;

counter means for counting number of the high-speed clocks;

extraction-clock producing means for producing extraction clocks in response to the counter means;

level-change detecting means for detecting a change of level in the serial data received by the shift register circuit, so that counting operation of the counter means is reset when the change of level is detected;

start-bit-existence acknowledging means for acknowledging existence of the start bit in the serial data on the basis of a fact that the counter circuit continues counting for a window time, which is determined in advance, without being reset in a duration of the start bit; and parallel-data extraction means, which is activated when the existence of the start bit is acknowledged, for extracting parallel data based on the serial data read out from the shift register circuit in response to the extraction clocks.

3. An asynchronous serial data receiving device according to claim 2 wherein speed of the high-speed clocks is 'm' (where 'm' is an integer arbitrarily selected) times higher than the transmission rate of the serial data and the window time is less than a half of the duration of the start bit.

* * * * *